Sept. 11, 1928.
J. O. SMITH
1,683,927
VALVE
Filed Aug. 15, 1927
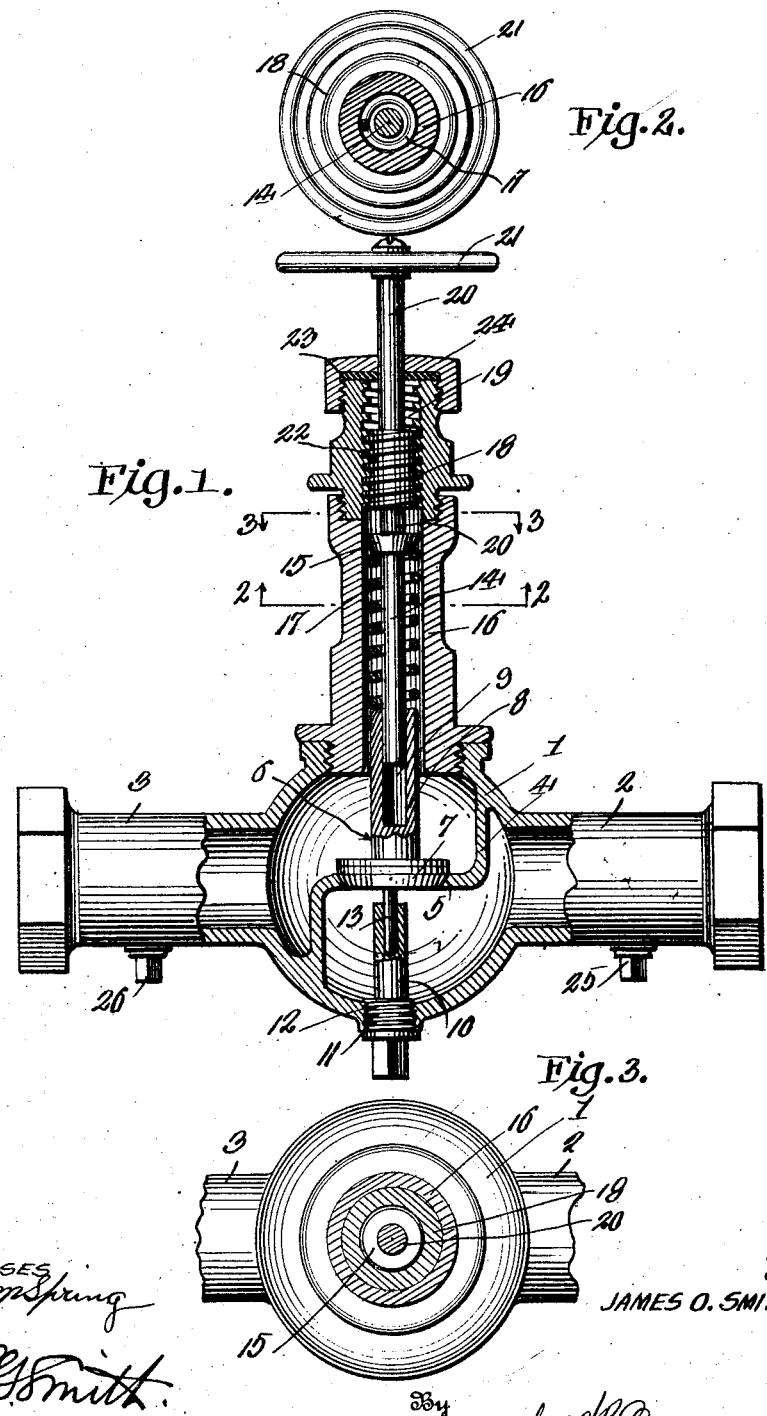
Inventor
JAMES O. SMITH Patented Sept. 11, 1928.

1,683,927

UNITED STATES PATENT OFFICE.

JAMES O. SMITH, OF KIEFER, OKLAHOMA, ASSIGNOR OF ONE-HALF TO LINCOLN E. HARSHBARGER, OF KIEFER, OKLAHOMA.

VALVE.

Application filed August 15, 1927. Serial No. 213,110.

This invention relates to improvements in valves and has as its primary object to provide a valve so constructed as to be adapted for substantially universal use, being so constructed that it may be employed to serve the purpose of a check valve, a high pressure pop valve, or a cut-off valve.

Another object of the invention is to provide a valve including a casing provided interiorly with a seat, a valve proper for coaction with the seat, and means for yieldably holding the valve to its seat and adjustable to vary the degree of pressure exerted upon the valve thus providing for automatic opening of the valve under different degrees of pressure.

Another object of the invention is to provide a valve of the class described above embodying a casing provided interiorly with a valve seat, a valve proper arranged within the casing for coaction with the seat, a spring coacting with the valve to yieldably hold the same to its seat, means adjustable to vary the tension of the spring, and likewise adjustable to positively hold the valve to its seat, so that, as before indicated, the valve may be employed as a check valve, a pop valve, or a cut-off valve.

Another object of the invention is to provide a valve of the class referred to which will be simple in construction and not liable to any disarrangement of its parts and which will be capable of adjustment to adapt it for various uses, without the necessity of removing any of the parts of the valve or re-arranging any of the parts thereof, the invention contemplating the employment of a single adjusting stem which may be properly adjusted so as to adapt the valve for use as a check valve, a high pressure pop valve, or a positive cut-off valve.

While the accompanying drawings and the description which is to follow, constitute a disclosure of the preferred embodiment of the invention, it will be understood that various changes may be made within the scope of what is claimed.

In the accompanying drawings:

Figure 1 is a vertical sectional view through the valve embodying the invention;

Figure 2 is a horizontal sectional view taken substantially on the line 2—2 of Fig. 1 looking in the direction indicated by the arrows;

Figure 3 is a similar view taken substantially on the line 3—3 of Fig. 1 looking in the direction indicated by the arrows.

In the drawings, the casing of the valve is indicated in general by the numeral 1 and is provided with an inlet branch 2 and an outlet branch 3, the casing being provided interiorly with the usual partition wall 4 which is in turn provided with a valve seat 5. The valve proper is indicated in general by the numeral 6 and the same comprises a head 7 adapted to rest upon the seat, in the closed position of the valve. The valve 6 further includes a tubular stem 8 the bore of which is indicated by the numeral 9, and means which will presently be described is provided in connection with the stem 8 to hold the valve 7 to its seat, either yieldably, or in a positive manner. The valve 6 is guided by a tubular guide 10 which is provided with a threaded plug portion 11 adapting it to be removably fitted in a threaded opening 12 formed in the lower side of the casing 1, a stem 13 being provided upon the under side of the valve head 7, concentrically thereof, and engaging in the bore of the said guide 10 as clearly shown in Fig. 1 of the drawings.

The means provided for adjusting the valve or holding the same either yieldably or in a positive manner, upon its seat, includes a stem 14 which is fitted at its lower end into the upper end of the bore 9 of the tubular stem 8 and is provided at its upper end with a head 15 which is of a diameter to adapt it to be slidably arranged and guided within a tubular neck 16 which is mounted upon the upper side of the valve casing and is in communication, at its lower end, therewith, a spring 17 of the compression type being arranged upon the stem 14 and bearing at its lower end against the upper end of the valve stem 8 and at its upper end against the head 15. The numeral 18 indicates a bushing which is removably fitted to the upper end of the neck 16 by means of the threaded connection illustrated in Fig. 1 or in any other suitable manner, and this bushing is formed interiorly with relatively coarse screw threads of the square type indicated by the numeral 19. The adjusting stem for the valve adjusting stem 14 is indicated by the numeral 20 and is provided at its upper end with a hand wheel 21 whereby it may be rotatably adjusted, and this stem is formed at its lower end with an enlarged cylindrical threaded portion 22 which has threaded engagement with the threads 19 within the bore of the bushing 18, a cap 23 being removably threaded onto the upper end of the bushing and provided centrally, in its top, with an opening 24 through which the stem 20 extends.

From the foregoing, it will be understood that when the stem 20 is rotated so as to assume an elevated position, the spring 17, bearing against the upper end of the tubular stem 8 of the valve 6 and at its upper end against the head 15, will, through its expansion, hold the head 15 in engagement against the lower end of the stem 20 and likewise hold the valve 6 yieldably in a lowered or seated position. With the parts thus adjusted, the valve may be used as a check valve, and the degree of pressure exerted against the valve 6, through the medium of the spring 17 may be varied by adjusting the stem 20, it being understood that when the stem 20 is rotated in a direction to cause upward adjustment thereof, the tension under which the spring is placed, will be less than when the stem 20 is adjusted so as to effect lowering thereof in the bushing 18. Therefore the invention, as so far described, contemplates a check valve which may be held to its seat under any desired degree of pressure. This construction likewise provides for utilization of the valve as a pop valve, this being accomplished by adjusting the stem 20 to exert a maximum degree of pressure upon the spring 17. When it is desired to employ the valve as a positive cut-off valve, the stem 20 is rotatably adjusted so as to cause the lower end of the stem 14 to engage in the lower end of the bore 9 in the stem 8 of the valve 6 and, in this manner, a positive pressure is exerted against the valve to hold the same to its seat.

In order that sediment may be drained from the branches 2 and 3 of the valve casing, drain plugs 25 and 26 are threaded into openings provided in the under sides of the said branches.

Having thus described my invention what I claim as new is:—

1. In a valve of the class described, a casing having a valve seat therein, a valve coacting with the seat, the said valve having a tubular stem, an adjusting stem fitting at one end in the said tubular stem of the valve and provided with an abutment, means for adjusting said stem longitudinally relative to the valve stem, and a spring interposed between the said tubular stem of the valve and the said abutment.

2. In a valve of the class described, a casing having a valve seat therein, a valve coacting with the seat and having a hollow stem, the bore of the stem being closed at a point above the head of the valve, an adjusting stem engaging at one end within the bore of the valve stem, means for adjusting the said adjusting stem longitudinally with respect to the axis of the valve stem and operable to effect engagement of the said end of the adjusting stem with the inner end of the bore of the valve stem to hold the valve positively to its seat, and a spring coacting with the adjusting stem and with the valve stem for yieldably holding the valve to its seat.

3. In a valve of the class described, a casing having a valve seat therein, a valve coacting with the seat and provided with a tubular stem, a neck mounted upon the upper side of the casing and having a bore, the upper end of the valve stem extending upwardly into the lower end of the said bore, a stem member mounted within the bore of the neck and having its lower end fitting slidably in the bore of the valve stem, the said stem member being provided at its upper end with a head, a spring arranged within the bore of the neck and bearing at its lower end against the upper end of the valve stem and at its upper end against the said head, and an adjusting stem for coaction with the head end of the said stem member whereby to effect adjustment thereof to vary the tension of the spring and thereby vary the pressure exerted by the spring upon the valve, and likewise provide for positive seating of the valve through the engagement of the lower end of the stem member in the lower end of the bore of the valve stem.

In testimony whereof I affix my signature.

JAMES O. SMITH.